Aug. 7, 1962    P. B. ZEIGLER    3,048,234
LINKAGE BOOSTER WITH ROTARY VALVE
Filed Dec. 4, 1958    3 Sheets-Sheet 1
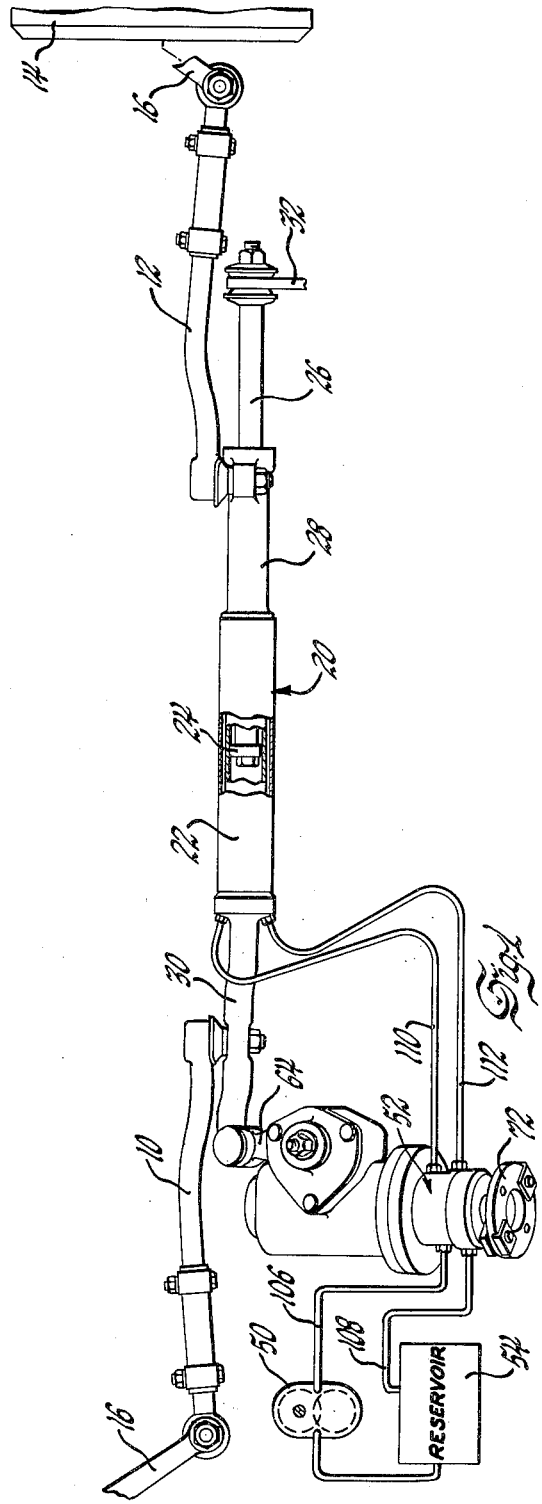
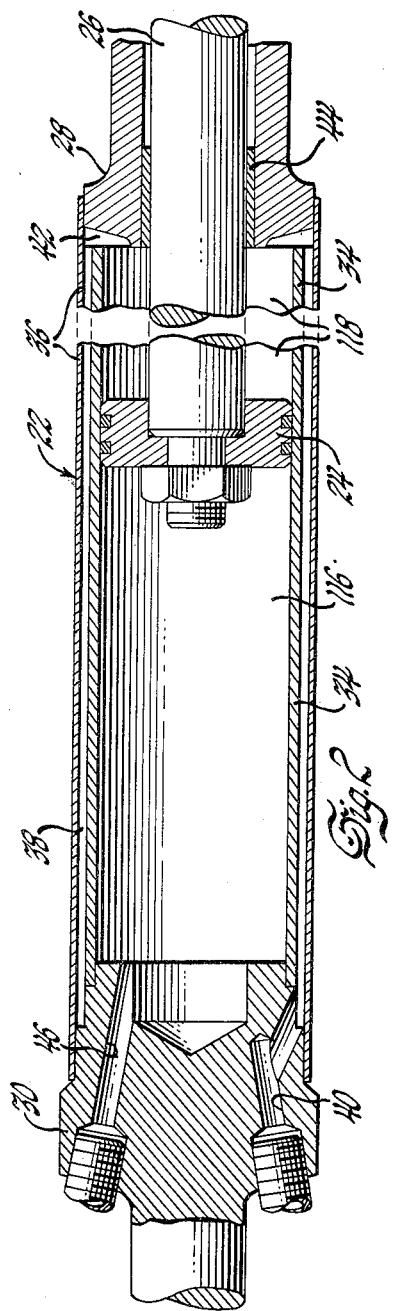
INVENTOR
*Philip B. Zeigler*
BY
*Bryce Beecker*
ATTORNEY

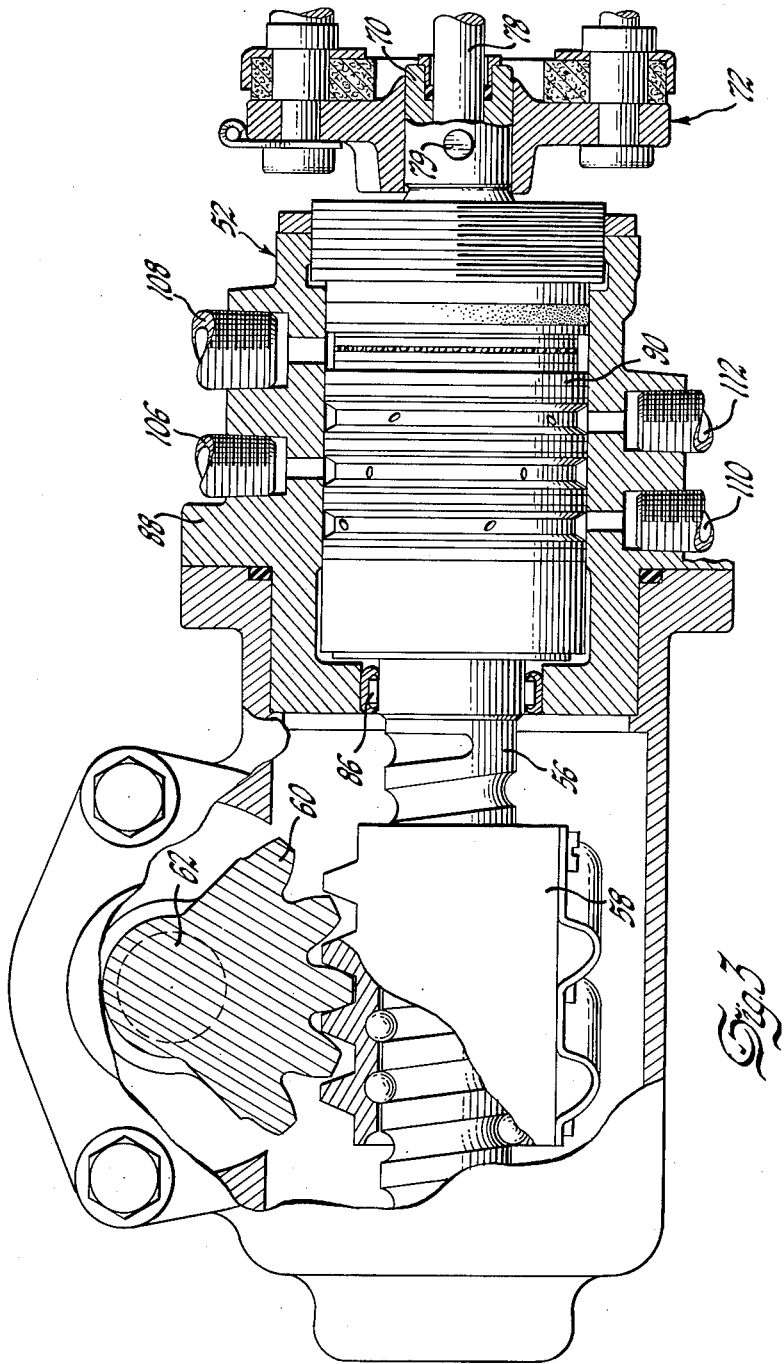

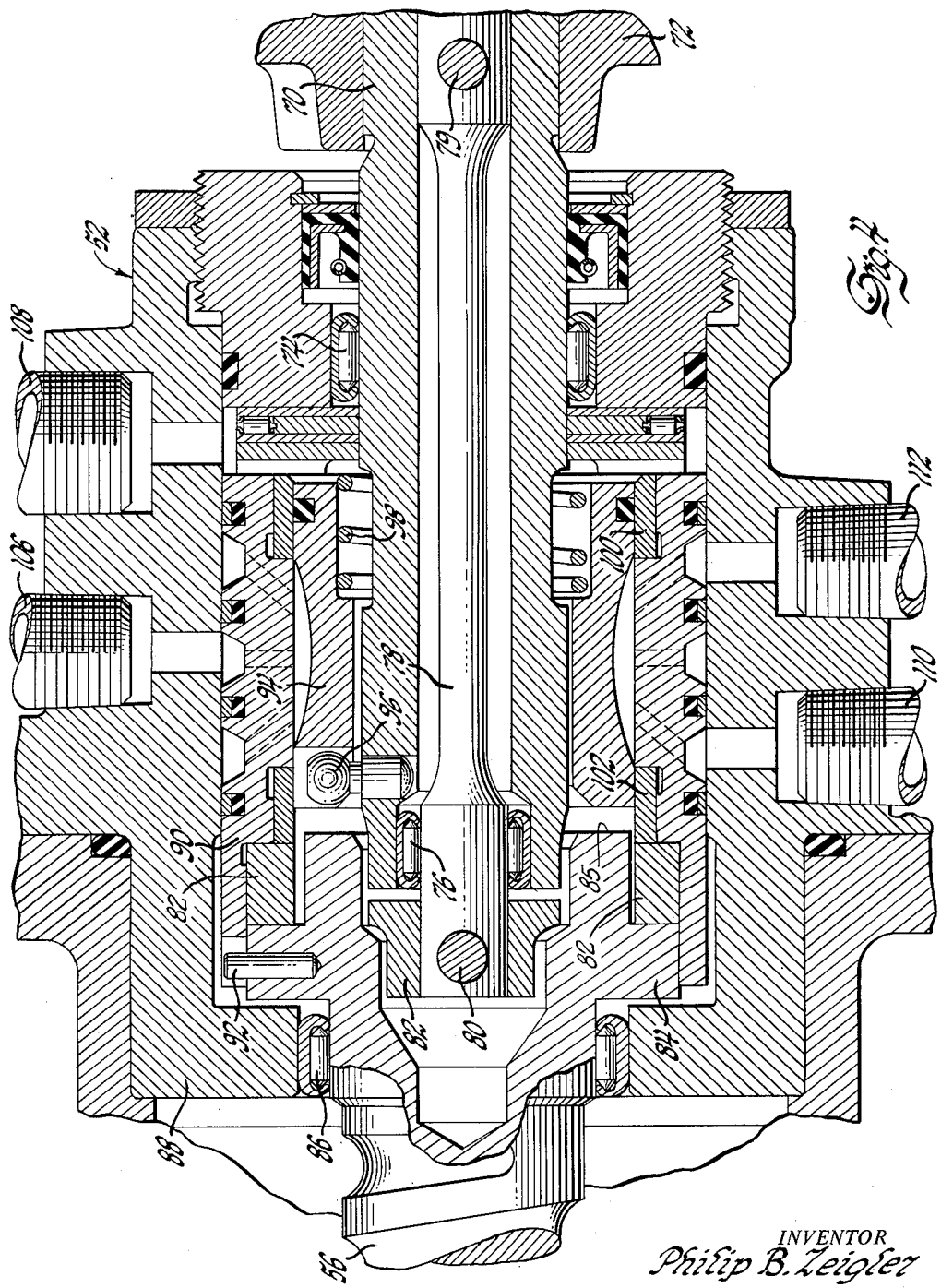

United States Patent Office 3,048,234
Patented Aug. 7, 1962

3,048,234
LINKAGE BOOSTER WITH ROTARY VALVE
Philip B. Zeigler, Saginaw, Mich., assignor to General Motors Corporation, Detroit, Mich., a corporation of Delaware
Filed Dec. 4, 1958, Ser. No. 778,103
1 Claim. (Cl. 180—79.2)

This invention concerns a fluid power steering gear installation.

Power steering gears concurrently in use are two general types, differing principally in the location of the fluid motor. Thus, in the case of the so-called "linkage boosters" the motor is conventionally positioned so that the same exerts its force against a drag link or relay rod, while in the case of the "integral" gears the motor is confined within the gear box, thus being carried in the engine compartment of the vehicle.

There has been considerable debate as to which of the two types of gears is superior on an over-all basis. It seems generally conceded that the booster designs are superior from the standpoint of cost, ease of installation and servicing, but lack the sensitivity of the integral gears and in general do not perform quite as well.

The present invention has as its principal object to provide a power steering gear combining the advantages of the prior designs. The invention makes use of a rotary control valve in lieu of the conventionally employed axial valve. Such valve is directly actuated by the steering shaft and is located ahead of the reduction gearing in the steering train. Also in accordance with the invention, the cylinder component of the fluid motor is integrated with a steering linkage member, normally the drag link or relay rod, and the motor is caused to react against the vehicle frame through the shaft of the piston component thereof. While the parts making up the installation are individually old, they have apparently never been so arranged heretofore and it is a significant aspect of the invention that parts generally considered equivalent thereto when thus arranged do not provide a gear giving comparable performance.

The invention will be specifically described with reference to the accompanying drawings showing a preferred embodiment thereof. In the drawings:

FIGURE 1 is a plan with certain parts shown broken away or diagrammatically;
FIGURE 2 is a broken longitudinal sectional view of the motor component;
FIGURE 3 is an enlargement with parts shown in section or broken away; and
FIGURE 4 is an enlarged sectional view showing the valve parts.

Referring first to FIGURE 1, the numerals 10 and 12 denote a pair of tie rods operably connected to the dirigible wheels, of which only one (14) is shown, via a pair of steering knuckle arms 16. Generally centrally disposed between the tie rods 10 and 12 is a fluid motor 20 comprising a cylinder 22 and a piston 24 having a shaft 26 (FIGURE 2). An adapter tube 28 having a ball and socket connection with the tie rod 12 is made fast to the right end of cylinder 24. A second adapter element 30 at the left of the cylinder 24 has a ball and socket connection with tie rod 10.

In operation, the reaction of the fluid motor is taken by the frame of the vehicle indicated at 32 in FIGURE 1, the connection being made through the piston shaft 26.

As shown by FIGURE 2, cylinder 22 is constituted of a pair of concentric tubular members 34 and 36, with the ends of the tubular members closed by the two adapters 28 and 30. The annular space 38 between members 34 and 36 allows for the flow of fluid into and from the piston shaft end of the motor. Such fluid courses a passage 40 and an annular passage 42 formed incident to the fabrication of the adapter 28. Fluid entering and exhausting from the left-hand chamber of the motor utilizes a passage 46, this passage like passage 40 being formed in the head of the adapter member 30.

Piston shaft 26, it is to be observed, reciprocates in a bushing 44 located in the adapter 28.

The fluid required for operation of the motor 20 is supplied by a pump 50 through a control valve 52 which exhausts to a reservoir 54 from which the pump draws. Valve 52 is illustrated by FIGURES 3 and 4 of which FIGURE 3 further shows a form of reduction gearing which may be used with advantage. This gearing includes a worm 56 carrying a ball nut 58, the rack teeth of which mate with those of a section gear 60 fixed to or integral with a rock shaft 62. Such shaft, as shown in FIGURE 1, connects with a pitman arm 64 in turn linked via a ball and socket connection to adapter member 30.

A stub shaft 70 in effect represents an extension of the usual steering shaft, not shown, and is connected to the steering shaft via a flexible coupling 72 which is the subject of U.S. Patent 2,753,848 to Robert W. Burton. In view of the description there provided, detailed description of the coupling here is not seen required.

Stub shaft 70 has associated therewith needle bearings 74 and 76, the bearings 76 being located between the stub shaft and a torsion bar 78 fixedly secured to the shaft by means of a stake pin 79. The bearings 74 are placed between stub shaft 70 and a threaded nut enclosing valve 52. At the left end of the torsion bar 78 will be seen a second stake pin 80 by means of which the torsion bar is connected to the flanged end 84 of the worm 56, which constitutes the input to the reduction gearing. This connection is made through an element 84 a portion of which is housed within the flange portion 84.

Worm 56 will be noted as turning in needle bearings 86 disposed between the worm and the housing 88 for the control valve 52.

The control valve comprises an outer sleeve 90, which is connected to worm 56 by means of a pin 92 fixed in the flange portion 84 and accommodated in a slot in the sleeve. Within the sleeve 90 is a sleeve 94 having a pin connection 96 with the stub shaft 70. A spring 98 tends to maintain the sleeve 94 against the ball head of the pjin 96. Rings 100 and 102 accommodated in annular recesses formed in the outer sleeves 90 serve to close off axial passages formed in such sleeve.

A more detailed description of the control valve including the various fluid passages therein will be found in the copending application of Philip B. Zeigler et al., Serial No. 762,153, filed September 19, 1958, as a continuation-in-part of their application Serial No. 687,728, now abandoned. Suffice it to say here that rotation of the inner sleeve member 94 relative to the outer sleeve member 90 is accompanied by the setting-up of a pressure differential across the piston in the fluid motor 20 with longitudinal displacement of the cylinder 22 in one direction or the other as determined by the direction of rotation of the sleeve 94.

Conduits 106 and 108, seen in FIGURES 3 and 4, respectively, connect with the pump 50 and the reservoir 54 (FIGURE 1), while conduits 110 and 112 connect respectively with passages 46 and 40 in the adapter 30.

*Operation*

As indicated hereinabove, the outer sleeve member 90 and the left hand end of the torsion rod 78 are connected to the worm 56, that is to the load, while the right hand end of the torsion rod and the inner valve component 94 are connected to the stub shaft 70. On rotation of the stub shaft the torsion rod which is under no preload immediately begins to twist. This twisting is accompanied by rotary movement of the inner sleeve 94 relative to the outer sleeve 90. The degree of the twisting is determined by the load (steering resistance) and is essentially a straight-line function. Thus, substantially twice as much effort is required at the steering wheel to twist the bar 2° as must be imposed to twist it 1°. The actual rate of the rod, of course, is set by control of the diameter and/or length thereof. In a preferred form of the invention, a rate of the order of 9 inch-pounds per degree of deflection obtains.

With the two sleeves in neutral position the pressure fluid supplied by the pump 50 flows through the valve and back to the reservoir 54 against the static pressure of the fluid contained in the chambers 116 and 118, delineated by the piston 24. Assuming a right turn, i.e., clockwise rotation of the stub shaft 70, the pressure balance in the chambers 116 and 118 is upset in favor of the chamber 116. Thus, the cylinder 22 is caused to move leftward with rightward swinging of the dirigible wheels 14. In the case of a left turn, the action, of course, is just the opposite, i.e., a pressure build-up occurs in chamber 118 forcing rightward displacement of the cylinder 24.

What is claimed is:

In an automotive vehicle having a pair of steerable road wheels actuated through a pair of steering knuckles and a corresponding pair of tie rods, a fluid power steering gear comprising a manually rotatable shaft, reduction gearing beyond said shaft including a rotatable input member and a rock shaft having a pitman arm secured thereto providing a static load, a control valve assembly, said manually rotatable shaft extending within said valve assembly in a concentric relationship, and having a terminal end near said input member, a torsion rod concentrically disposed within said manually rotatable shaft and interconnecting said manually rotatable shaft and said input member to provide a lost motion connection between said shaft and said input member, said control valve assembly comprising inner and outer sleeve members, said inner valve sleeve member comprising a slot receiving a pin mounted in the terminal end of said manually rotatable shaft so as to be rotated thereby, said outer valve sleeve member having a slot receiving a pin mounted in said input member and rotatable therewith, said inner and outer valve sleeves being displaced relative to one another immediately upon rotation of said shaft because of said lost motion connection provided by said torsion rod when said shaft initially moves said inner valve sleeve, a source of fluid pressure, fluid conduits between said source and said valve, and a fluid motor in fluid circuit with said valve and comprising a piston connected to the frame of the vehicle and a cylinder through which said tie rods are interconnected, said fluid motor being supplied with pressure fluid as said valve sleeves are displaced to always afford a power-assist while steering a vehicle.

References Cited in the file of this patent
UNITED STATES PATENTS

| | | |
|---|---|---|
| 2,640,322 | Puerner | June 2, 1953 |
| 2,755,627 | Smith | July 24, 1956 |
| 2,762,231 | MacDuff | Sept. 11, 1956 |
| 2,855,789 | Von Thungen | Oct. 14, 1958 |
| 2,867,129 | Burton | Jan. 6, 1959 |